June 10, 1958     L. C. WEBB     2,837,895
HOT AIR ENGINE
Filed Sept. 28, 1953     4 Sheets-Sheet 1
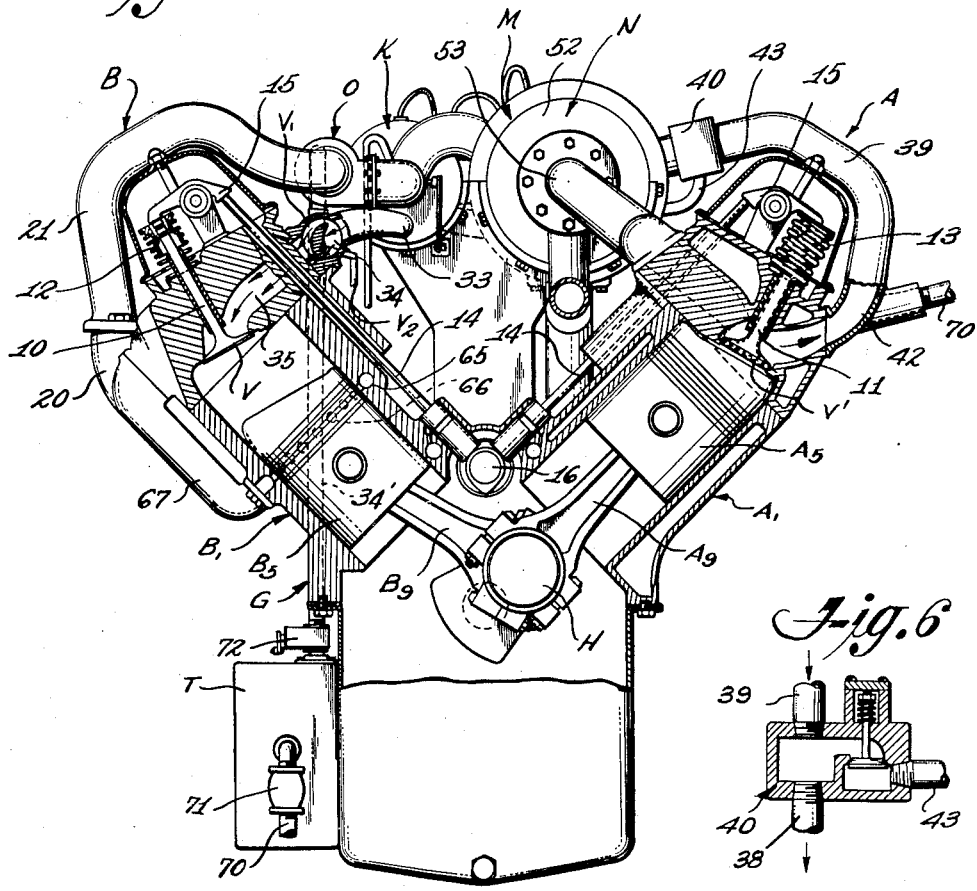
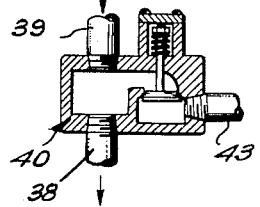
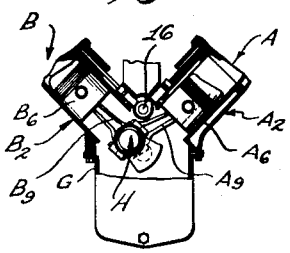
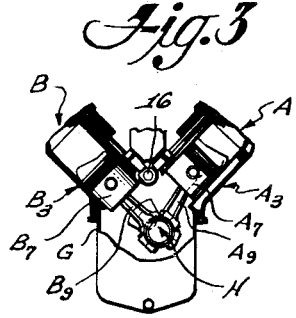
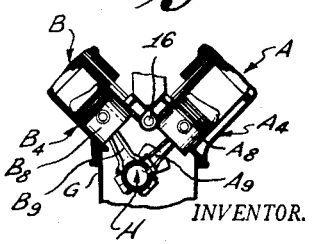
INVENTOR.
LEON C. WEBB
BY Luther L Mack
Attorney

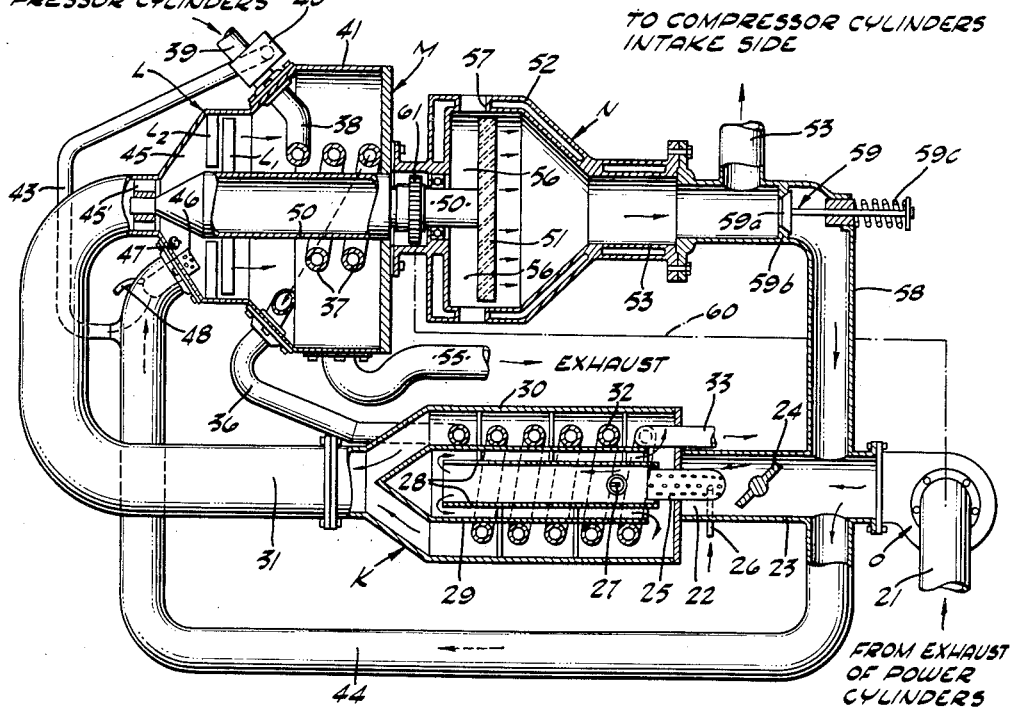
Fig. 5.
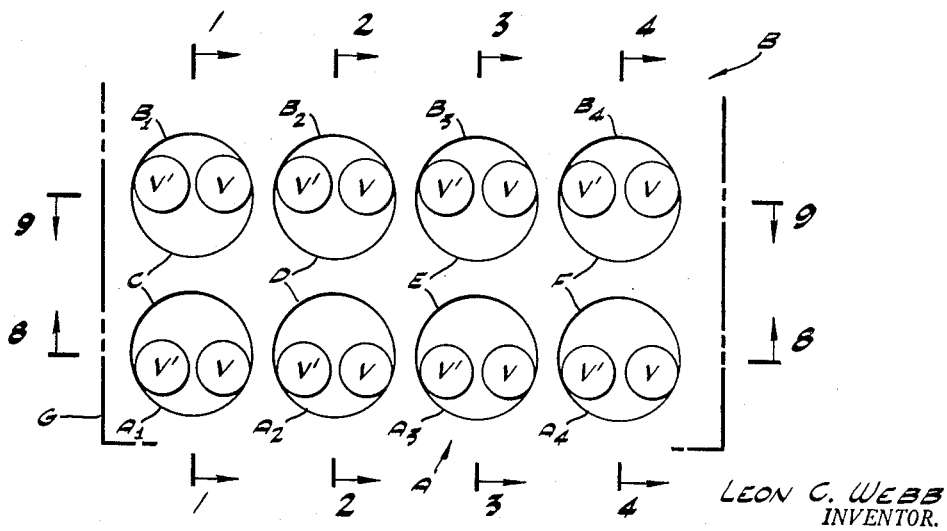
Fig. 7.
Leon C. Webb
INVENTOR.
ATTORNEYS

June 10, 1958 — L. C. WEBB — 2,837,895
HOT AIR ENGINE

Filed Sept. 28, 1953 — 4 Sheets-Sheet 3

INVENTOR.
LEON C. WEBB
BY Luther L. Mack
Attorney

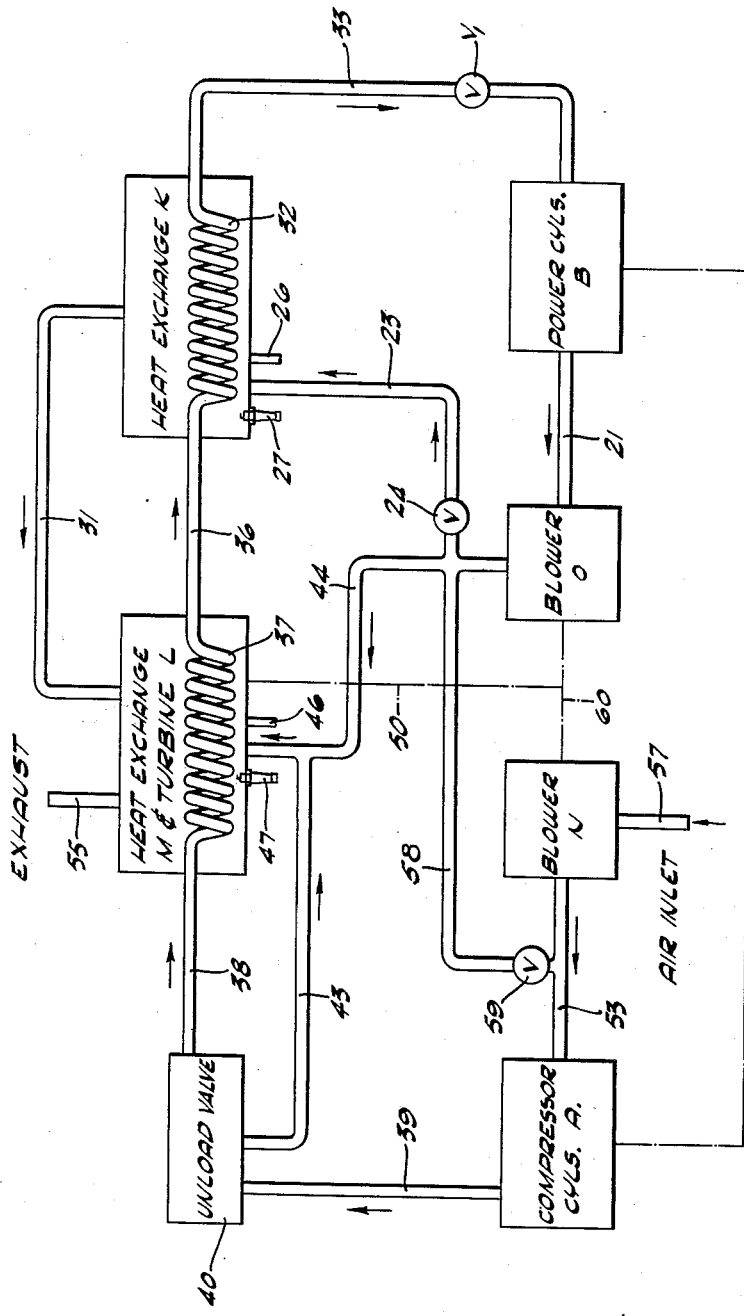

United States Patent Office

2,837,895
Patented June 10, 1958

2,837,895

HOT AIR ENGINE

Leon C. Webb, Van Nuys, Calif., assignor of twenty-five percent to Clara M. Long, Van Nuys, Calif.

Application September 28, 1953, Serial No. 382,639

5 Claims. (Cl. 60—59)

This invention relates to a hot air engine, and particularly to a hot air engine embodying a piston-type compressor and power unit operatively associated with a turbine and with auxiliary heating means. The present application is a continuation-in-part of my co-pending application Serial No. 112,904, filed August 29, 1949, now abandoned, for a Turbo Thermal Expansion Engine.

It is recognized that conventional internal combustion engines of the piston type, such as are employed to drive automobiles, trucks, and trains, are characterized by relatively low efficiency and high gas consumption per mile of travel. It is also recognized that gas turbines, especially when adapted to drive land vehicles such as trucks, are also characterized by a low efficiency and extremely high gas consumption although they are relatively small and light in weight. The low efficiency of the gas turbine in large part results from the fact that a major portion of the turbine output power is employed, not to drive the drive shaft but instead to operate the compressor which feeds air to the turbine. The enormous power required to drive the compressor, which is conventionally on the same shaft as the rotating component of the turbine, means that only a minor proportion of the turbine power may be employed to operate the drive elements of a vehicle on which the structure is mounted.

In view of the above factors characteristic of the field of internal combustion piston engines and gas turbines, it is an object of the present invention to provide an engine which combines the desirable characteristics of an internal combustion piston engine and a gas turbine engine to achieve an extremely high efficiency and desirable operating characteristics.

Another object of the invention is to provide an engine in which air utilized to operate the piston elements is exhausted to a combustion chamber where it is mixed with fuel and combusted to provide hot gases adapted to operate a turbine.

A further object is to provide a rotary compressor or blower adapted to feed air to a piston-type compressor, there being valve means interposed between the rotary and piston compressors and which are open during the downstroke of the compressor pistons so that the pistons receive power from the rotary compressor, and are closed during the upstroke of the compressor pistons so that the air is additionally compressed and may be delivered to other portions of the engine.

An additional object is to provide power and compressor cylinders operatively connected to a common shaft, and to provide gas-turbine means operated by combustion of air exhausted from the power cylinders and mixed with fuel, the turbine means being adapted to drive a blower which both imparts power to the piston in the compressor cylinders and effects an initial compression of air fed to the compressor cylinders.

These and other objects and advantages of the invention will be more fully set forth in the following specification and claims considered in connection with the attached drawings to which they relate.

In the drawings:

Figure 1 is a transverse sectional view of a V-type engine, taken on line 1—1 of Figure 7 through opposite cylinders of a first pair of compressor and power cylinders;

Figures 2, 3 and 4 are diagrammatic sectional views corresponding generally to Figure 1 but taken, respectively, on lines 2—2, 3—3, and 4—4 of Figure 7 to show the remaining pairs of compressor and power cylinders;

Figure 5 is a diagrammatic view, largely in horizontal section, illustrating the air-heating, air-moving, and turbine elements of the engine;

Figure 6 is a sectional view of a spring-loaded unloader valve which is shown in Figure 5 as located in the exhaust line from the compressor cylinders;

Figure 7 is a diagram showing the arrangement of the cylinders, and of the intake and exhaust valves in the cylinder head;

Figure 8:
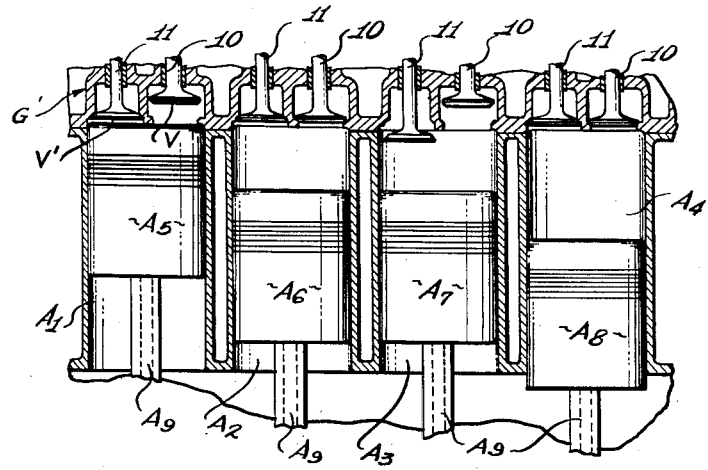
Figure 9:
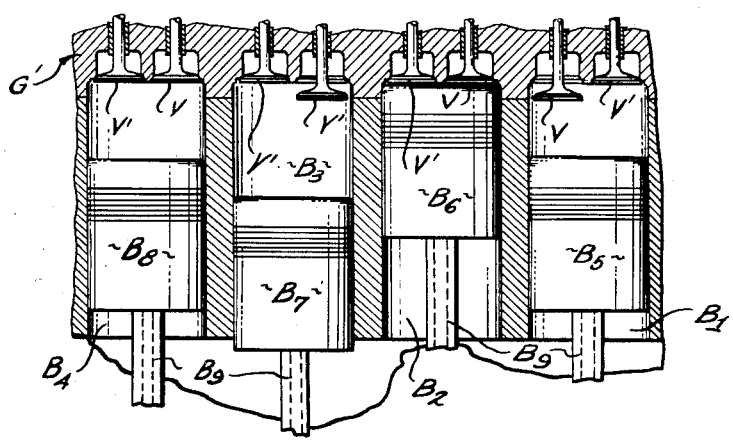

Figures 8 and 9 are longitudinal sectional views taken, respectively, on lines 8—8 and 9—9 of Figure 7; and Figure 10 is a schematic or flow diagram showing the connections between the various components of the engine.

Although my invention may be applied to various types of multiple cylinder engines, I have shown the same as applied to a V-type engine especially adapted for producing power by the use of preheated air instead of by the combustion of fuel in the cylinders. To such end an even number of cylinders is employed—in this case eight—subdivided into two banks of four cylinders each. The transversely opposite cylinders of the two banks form separate pairs, as shown in Figure 7, there being two parallel banks A and B of cylinders arranged in transversely aligned pairs C, D, E, and F.

Bank A includes cylinders $A_1$, $A_2$, $A_3$, and $A_4$, which serve as air compressors, and bank B includes cylinders $B_1$, $B_2$, $B_3$, and $B_4$, which serve as power cylinders. Cylinders $A_1$—$B_1$, $A_2$—$B_2$, $A_3$—$B_3$, and $A_4$—$B_4$, are transversely aligned in pairs on the motor block G.

Cylinders $A_1$, $A_2$, $A_3$, and $A_4$ have pistons $A_5$, $A_6$, $A_7$, and $A_8$, respectively, which are connected with a common crankshaft H; and cylinders $B_1$, $B_2$, $B_3$, and $B_4$ have pistons $B_5$, $B_6$, $B_7$, and $B_8$, respectively, which are also connected with crankshaft H, all by means of similar connecting rods as at $A_9$ and $B_9$.

The cylinders of the A and B groups have similar intake valves V and similar exhaust valves V′ with stems, as at 10 and 11, respectively, slidable in the head G′. Valves V and V′ are urged to closed positions in their seats by springs 12 and 13, respectively. Push rods as at 14, and rocker arms as at 15, of conventional form and arrangement, are operated by a cam shaft 16 for opening all valves V of the A and B groups as well as valves V′ of the B group. The exhaust valves V′ of the compressor group A are spring loaded at 13 for normal closing and are adapted to be opened by pressure in cylinders $A_1$, $A_2$, $A_3$, and $A_4$, as air is compressed therein on the upstrokes of pistons $A_5$, $A_6$, $A_7$, and $A_8$.

In Figure 5, I have shown a turbo-thermal heat exchange apparatus interconnecting the A and B groups of cylinders in a novel and efficient manner for accomplishing the desired results. Said apparatus includes a primary generator or heat exchange unit K, a turbine L combined with a second heating unit M, a rotary compressor or forced draft blower unit N and a centrifugal induced draft blower unit O, arranged and interconnected as will next be described.

Exhaust air from the B or power cylinders passes from their exhaust manifold 20 and through a pipe 21 into blower unit O, and thence forcibly into a mixing chamber 22 within a cylinder 23, and under control of a valve 24 into an atomizing fuel burner 25. Burner 25 has a perforated wall into which fuel is injected through a fuel feed tube 26, thereby mixing the injected air and fuel for proper combustion and ignition as by means of a spark plug 27.

Unit K is of cylindrical form and comprises an axially disposed inner tube 28, forming a combustion chamber, and a larger tube 29 which is concentric with and radially spaced from both the outer wall or housing 30 of unit K and the inner combustion tube 28. The outlet end of housing 30 and the corresponding end of tube 29 are correspondingly conical, the housing 30 having a central outlet while the adjacent end of tube 29 is closed. Both ends of tube 28 are open, as is also the remaining end of tube 29. Hence, hot gases generated in chamber 28 are directed into the closed end of tube 29, thence back through the annular space between tubes 28 and 29, and thence forwardly again through the annular space between housing 30 and tube 29, from which they are discharged into a pipe 31 leading to turbine L.

Within the space between tube 29 and housing 30 is arranged an air-heating coil 32 with an outlet section 33 leading to an intake manifold 34 (Figure 1) which is common to the air inlets 35 of the power group of cylinders B, and has a throttle valve $V_1$ mounted therein and operable by a suitable device $V_2$ for controlling the flow of air into the intake passages 35. The inlet section 36 of coil 32 leads to a coil 37 of unit M, the coil 37 having an inlet section 38 connected with a tube 39 through an unloader valve 40 (Figure 6) which is fixed to the housing 41 of units L and M. Tube 39 leads to the exhaust manifold 42 of the compressor group A of cylinders. Valve 40 also has a tube 43 extended therefrom and connected with a by-pass line 44 which extends between cylinder 23 and the combustion chamber 45 of turbine unit L. Thus, tube 43 relieves excess pressure at valve 40 and applies the same to chamber 45 through the outlet of by-pass 44 at a point adjacent a burner 46 and a spark plug 47 in chamber 45.

The by-pass 44 between cylinder 23 and turbine unit L is for the purpose of diverting a decided proportion of the power cylinder exhaust air in a direct path to chamber 45, where it is combusted and then passes outwardly to the atmosphere through exhaust passage 55 from chamber 45. The by-pass is under the control of the throttle-like valve 24 which regulates the quantity of exhaust air delivered to unit K. The by-pass is desirable because a sufficient proportion of oxygen from fresh air is necessary to effect proper combustion and high heat in chamber 45.

Burner 46 has a perforated wall similar to burner 25 so that fuel injected into the burner from a supply tube 48 will be atomized when expelled through the peripheral perforations. The atomized fuel mixes with hot air injected into chamber 45 from by-pass 44, and the mixture is ignited by spark plug 47. The force of the burning gases causes rapid rotation of turbine L and diffusion of the gases around coil 37 so as to add heat to the air in such coil for injection through coil 32 to the cylinders of the B group. Thus, the hot compressor cylinder exhaust air delivered through coil 37 is further heated in chamber 45 and again heated in coil 32 of unit K so as to be greatly heated and expanded by the time it passes through tube 33 to the group of power cylinders B.

Turbine L has a shaft 50 connected axially with and for rotating the rotor 51 of unit N, the rotor being mounted in a suitable housing 52 with an outlet 53 connected to the intake manifold for the cylinders of group A. The products of combustion are exhausted to the atmosphere from the unit M through the passage or pipe 55, and fresh air from the atmosphere is admitted to blower chamber 56 through peripheral orifices 57 in housing 52.

In order to permit compressor N and turbine L to operate at their fullest efficiency and speed at all times, a by-pass tube 58 is provided between outlet 53 and cylinder 23 opposite its connection with by-pass 44. The flow of air through by-pass 58 is controlled by a normally closed spring-loaded valve 59 comprising a plunger 59a which is urged toward its seat 59b by a tension spring 59c. When the pressure created by rotary compressor N exceeds a certain predetermined value, the plunger 59a is forced off its seat 59b and air is by-passed through pipe 58 to cylinder 23 from which it passes both to heat exchanger K and, through the by-pass 44, to turbine L and heat exchanger M. After the pressure has been thus relieved, the tension spring 59c operates to press the plunger 59a against its seat 59b, all of the air then flowing from compressor N and through pipe 53 to the intake side of compressor cylinders A. The described by-pass arrangement is extremely important in that it prevents the wasting of work and power by the over-compression of air in the compressor cylinders and which would merely result in excessive operation of unloader valve 40. The by-pass 58 prevents such wasting and work by conducting excess pressure directly to the heat exchangers where it is mixed with fuel and employed for combustion purposes, all without the necessity of the air passing through the compressor cylinders.

It will be noted that the force of the gases entering into chamber 45 of unit L from pipe 31 through orifices 45' aids in causing rapid rotation of turbine rotor $L_1$ as the gases move through the turbine stator $L_2$. As the turbine rotates the compressor rotor 51 is correspondingly driven for charging the compressor group of cylinders A with fresh air and for imparting power thereto. Rotor $L_1$ and stator $L_2$ are suitably vaned to effect rotor rotation as in conventional turbines.

The unit L, which is operated by the generated hot gases, serves to mechanically drive the compressor blower unit N. Unit M serves to reheat the exhaust air from the compressor cylinders and which passes through pipe 39 and valve 40 to heater tube 38 and coil 37 of unit M, and thence to tube 36 and coil 32 for delivery of the finally heated air to the intake side of the power cylinders. Thus, in operation, air which has been heated in unit M and reheated in unit K constitutes the sole intake of the power cylinders. The same air is exhausted from the power cylinders and conducted through the units O and K and used for operation of the turbine unit L, the ultimate exhaust of the system being through pipe 55 connected with unit M. The unit N is in effect a turbo compressor which induces a flow of air from the atmosphere to the compressor side of the engine. The air enters the rotary compressor N and is compressed and delivered to the compressor side of the reciprocating engine for compressing to higher pressure and delivery through valve 40 and pipe 38 to heater coil 37. The air is then heated and passes through tube 36 and coil 32 to the intake side of the power cylinders, thence through exhaust pipe 21 and blower O to tube 23, and thence to the heater K, at which point combustion takes place. The exhaust from unit K is delivered through pipe 31 to turbine unit L, to aid in driving said turbine unit, and the gases from the several sources are exhausted through pipe 55.

Blower unit O is operated by the turbine L through a chain of gears or other driving medium, only indicated herein as a line 60 operatively connecting shaft 50 and a gear 61 thereon with an axial driving gear (not shown). Thus, unit O acts as an exhaust booster for scavenging the cylinders B in each cycle of operation. The unit O may be considered as a compressor mechanically driven from the turbine L but is effective for super-induction of the flow of exhaust gas from the power cylinders. Hence it is not a turbine nor is it operated by pressure of the exhaust gases but it is mechanically driven by the turbine L, although some energy may be applied thereto which is derived from the exhaust from the power cylinders.

Each cylinder of the B group has an annular channel 65 surrounding and in communication with it through a plurality of orifices 66, as shown in Figure 1, and which are located in a common plane slightly above the lowermost positions of the piston domes or tops. Channels 65 are connected with the exhaust manifold 20 of the power cylinders by a pipe 67. Hence, after said pistons have moved downwardly on each power stroke the expanded air is exhausted near the bottoms of the cylinders through channel 65, pipe 67 and pipe 21 for combustion in unit K. Exhaust also takes place through the valves V' of the power cylinders, as will be described subsequently.

The spark plugs 27 and 47 may be intermittently energized under control of a suitable distributor or continuously energized as may be found desirable, or any suitable type of igniter may be employed in lieu thereof.

Starting of the engine may be effected electrically, or pneumatically, by the employment of a compressed air tank T (Figure 1) connected with the power cylinder intake manifold 34 by a tube 34' and which is charged with air under pressure from the compressor cylinders A as by means of a pipe 70. Pipe 70 leads from exhaust passage 42 to tank T and has a check valve 71 located therein for retaining pressure in the tank. Compressed air from tank T is delivered through tube 34' to manifold 34 under control of a suitable valve 72.

Instead of employing the pneumatic starting means described in the preceding paragraph, starting may be effected by providing suitable spark plugs and fuel injectors in the power cylinders B. Such spark plugs and injectors would only be operative during starting and their use would be discontinued immediately after the engine starts operating in the described manner. Furthermore, the amount of fuel injected into the cylinders for starting purposes would be relatively small, and would be such that only a minor proportion of the oxygen in the cylinders would be consumed. It follows that the major proportion of the oxygen would still remain and would be delivered to the scavenging blower O for transmittal to the combustion chambers.

The operation of the engine will next be described, together with a detailed description of the settings of the more important operating components. The compressor or blower unit N delivers air through pipe 53 to the intake manifold for compressor cylinders A, this pressure being relatively constant due to the presence of by-pass valve 59. For example, in a preferred form of the invention the valve 59 is set so that it will open when the pressure in the exhaust from unit N is one hundred p. s. i., which means that the pressure delivered to the compressor cylinders through pipe 53 will always be substantially one hundred p. s. i. Cam shaft 16 and its associated components are so constructed that the intake valves V for compressor cylinders A will be open when their respective pistons $A_5$–$A_8$ are approximately at the upper ends of their strokes. In addition, the cam shaft 16 and related components are set so that intake valves V of compressor cylinders A will close when the associated pistons $A_5$–$A_8$ have completed approximately one half to three fourths of their downstrokes. Furthermore, the springs 13 associated with the exhaust valves V' for the compressor cylinders are set so that they will be pressure opened when the pressure in the cylinders is substantially higher than the intake pressure, for example on a ratio of four to one. With such settings, the compressor exhaust valves V' will open when the pressures in the associated compressor cylinders reach a value of four hundred p. s. i. The exhaust value at which exhaust valves V' open is achieved substantially before the compressor pistons reach the upper ends of their strokes, for example when the pistons have moved approximately seven eighths of the way from their lowermost to their uppermost positions.

With the above or equivalent valve settings, and using the stated pressures for purposes of simplicity of illustration and description, the one hundred p. s. i. pressure applied to each compressor piston while it is moving downwardly from its upper position through one half to three fourths of its stroke will impart a very substantial amount of power to the pistons which will be transmitted to a connecting rod $A_9$ to crankshaft H. Thereafter, upon closing of each compressor intake valve V, additional power will be imparted to the compressor piston during expansion of the admitted air while the piston travels downwardly to the bottom of its stroke. For example, if it is assumed that the intake valve closes when each compressor piston has traveled through one half of its downstroke, the air pressure in the associated cylinder will be reduced from one hundred p. s. i. to fifty p. s. i. by the time the piston reaches its bottom position. During this remaining half of the downstroke, however, additional power will be imparted to the piston and transmitted to crankshaft H.

The fifty p. s. i. pressure present in each compressor cylinder $A_1$–$A_4$ when the associated piston $A_5$–$A_8$ is in its bottom position is increased to four hundred p. s. i. by the time the piston has traveled upwardly through approximately seven eighths of its upstroke. When the four hundred p. s. i. value is reached, the associated exhaust valve V' opens and, during the remaining upstroke of the piston, air at four hundred p. s. i. is forced through pipe 39 to unloader valve 40. In the event that the air pressure in pipe 39 exceeds the four hundred p. s. i. or other desired operating pressure, the unloader valve will open to admit excess air to pipe 43 leading to by-pass 44. It is thus assured that air delivered to tube 38 and heater coil 37 will be at the optimum operating pressure of four hundred pounds, the unloader valve 40 being set to open at this value. It is pointed out that the unloader valve 40 comprises, as shown in Figure 6, a chamber directly connecting tubes 38 and 39, and a spring-loaded plunger which opens, when the pressure in the chamber is greater than the desired value, and permits passage of air to tube 43 leading to by-pass 44.

To summarize and emphasize the above-described operation, power is delivered by rotary compressor N, which is driven by turbine L, to the compressor pistons during their downstrokes. This power supplies a substantial proportion of power to crankshaft H and is extremely important in achieving the high efficiency of the engine. During the upstrokes of the compressor cylinders, a substantial compression is achieved and the compressed air is delivered through unloader valve 40 to heater coil 37 for use in operating the power cylinders B as will next be described.

Upon arriving at the heater coil 37 of unit M, the compressed air, for example at the illustrative pressure of four hundred p. s. i., is greatly heated and expanded. This heated and expanded air passes through tube section 36 to heating coil 32 in unit K where it is additionally heated and expanded. From heating coil 32 the hot expanded air is delivered, under the control of throttle valve $V_1$, to the cylinders $B_1$–$B_4$ of power group B. In each instance, the delivery of air is under the control of an intake valve V of the power group, the cam shaft 16 and associated components being set so that each valve V opens when its associated piston $B_5$–$B_8$ is at approximately the upper end of its stroke. The respective intake valves V of the power group remain open, under the control of cam shaft 16, until their associated power pistons have completed substantially their entire downstrokes, the cam shaft 16 being set so that each valve V closes just prior to the passing of the upper end of its associated piston downwardly past the exhaust orifices 66. The cam shaft 16 and associated components are also set so that the exhaust valves V' for the power cylinders will open simultaneously with the passing of the upper piston ends downwardly past the exhaust orifices 66, so that exhaust occurs concurrently from the upper and lower ends of the cylinders immediately after closing of their intake valves V. With the described arrangement, power is delivered from the hot expanded air to the power pistons $B_5$–$B_8$ during substantially their entire downstrokes, which operates through connecting rods $B_9$ to deliver power to crankshaft H. This power constitutes the major proportion of the operating power for the system, the remainder of the power being received from compressor pistons $A_5$–$A_8$ as described above.

The simultaneous exhausting of air from both ends of each power cylinder provides a very rapid scavenging operation which reduces the back pressure in the power cylinders and increases the efficiency of the engine. To further increase the scavenging speed, and reduce back pressure, the induced draft blower O is provided, as previously described, and sucks exhaust air through pipe 21 from the exhaust manifold 20 leading to both the upper and lower ends of the power cylinders.

The air from blower O, and also air by-passed through pipe 58 from compressor unit N, is delivered both to heat exchanger K and directly through by-pass 44 to turbine L, as determined by the setting of valve 24. Ordinarily, the setting of valve 24 is such that substantial components of the exhaust air pass through unit K and also through by-pass 44, although the throttle valve may, if desired, be so adjusted that either one or the other of the unit K and by-pass 44 receive all of the exhaust air.

The component of air flowing past throttle valve 24 passes to the atomizing fuel burner 25, where it is mixed with fuel, and the fuel-air mixture is ignited by the spark plug 27 to provide hot products of combustion in the heat exchanger. The hot products of combustion first effect heating of the compressed air in heater coil 32 and then pass through pipe 31 and orifices 45' into chamber 45 of the combined heater and turbine units L—M. The component of air which does not flow past throttle valve 24 is by-passed into pipe 44 and is supplemented by any air passing through pipe 43 from unloader valve 40. This air passes through atomizing fuel burner 46 and the fuel-air mixture is ignited by spark plug 47 to provide extremely hot products of combustion in chamber 45. The products of combustion in chamber 45, both delivered thereto through pipe 31 and generated therein by operation of fuel burner 46 and spark plug 47, pass through the vanes of turbine stator $L_2$ and rotor $L_1$ to effect rapid rotation of turbine shaft 50. The rotation of shaft 50 effects turning of blower or compressor rotor 51 and also, through the shaft or gear connection indicated schematically at 60, effects rotation of scavenging blower O. Prior to exhausting through pipe 55, the hot products of combustion in chamber 45 effect heating of the compressed air in heater coil 37.

As the compressor rotor 51 is thus turned, it sucks in air through intake orifices 57 and delivers it through pipe 53 to the intake manifold for the compressor cylinders. This air, for example at the one hundred p. s. i. pressure given in the example, acts against the compressor pistons $A_5$–$A_8$ to impart power thereto as previously described. Should the turbine speed and compressor action be such as to create a pressure in excess of that which it is desired to deliver to the compressor cylinders $A_1$–$A_4$ the by-pass valve 59 opens and permits excess air to flow through pipe 58 to cylinder 23 where it mixes with air from scavenging blower O. In this manner, it is assured that the pressure of the air delivered to the compressor cylinders $A_1$–$A_4$ will be substantially constant, so that the output air pressure of the compressor cylinders will also be substantially constant and the unloader valve 40 rendered relatively unnecessary.

It is to be understood that the turbine L and compressor M may be of any suitable type, and that the compressor N may comprise one or more stages of conventional centrifugal compressor units. The turbine L and compressor unit N may be relatively small since they are not directly connected to any output power shaft, and since the compressed air fed to the combustion chambers does not come directly from the compressor unit N but instead comes from the exhaust of power cylinders $B_1$–$B_4$. This action is possible since no combustion occurs in the power cylinders and the oxygen therein is retained for subsequent use in the combustion chambers. The above is to be distinguished from conventional gas turbines, in which a very large proportion of the shaft power is utilized to drive the rotary compressor which directly feeds the turbine.

The described cycle is extremely efficient since relatively little heat or pressure is wasted. Thus, air exhausted from the power cylinders, and still at a relatively high pressure and temperature, is passed through the respective combustion chambers where its heat and pressure are utilized to increase turbine efficiency and decrease the amount of fuel required in the combustion chambers. Furthermore, the hot compressed air from the compressor cylinders is passed through heating coils 37 and 32 where additional heat is imparted to the air prior to its delivery to the power cylinders, so that the compressor cylinders may be considered to be a source of heat along with the heater coils 37 and 32.

While the particular apparatus herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A hot air engine, comprising a compressor cylinder and a power cylinder, compressor and power pistons mounted, respectively, in said cylinders and connected to a common crankshaft, a rotary air compressor adapted to conduct compressed air to the intake of said compressor cylinder, first conduit means to connect the outlet from said compressor cylinder to the intake of said power cylinder, first valve means interposed between said rotary compressor and compressor cylinder and controlled to be open during a major portion of the downstroke of said compressor piston and closed during a major portion of the upstroke thereof, second valve means disposed in said first conduit means and controlled to open after said compressor piston has completed a major portion of its upstroke and additionally compressed the air delivered to said compressor cylinder, combustion chamber means enclosing at least a portion of said first conduit means, second conduit means to conduct exhaust air from said power cylinder to said combustion chamber means, means to deliver fuel to said combustion chamber means and to effect in said combustion chamber means the combustion of said exhaust air from said power cylinder and said fuel for generation of hot gases, a turbine associated with said combustion chamber means and adapted to be operated by said hot gases, means to drivingly connect said turbine and said rotary compressor, a by-pass line connected between the outlet from said rotary air compressor and said second conduit means, and means in said by-pass line to block the flow of air therethrough except when the output pressure of said rotary air compressor exceeds a predetermined value.

2. A hot, air engine, comprising a compressor cylinder and a power cylinder, compressor and power pistons mounted, respectively, in said cylinders and connected to a common crankshaft, a rotary air compressor adapted to conduct compressed air to the intake of said compressor cylinder, first conduit means to connect the outlet from said compressor cylinder to the intake of said power cylinder, first valve means interposed between said rotary compressor and compressor cylinder and controlled to be open during a major portion of the downstroke of said compressor piston and closed during a major portion of the upstroke thereof, second valve means disposed in said first conduit means and controlled to open after said compressor piston has completed a major portion of its upstroke and additionally compressed the air delivered to said compressor cylinder, combustion chamber means enclosing at least a portion of said first conduit means, second conduit means to conduct exhaust air from said power cylinder to said combustion chamber means, means to deliver fuel to said combustion chamber means and to effect in said combustion chamber means the combustion of said exhaust air from said power cylinder and said fuel for generation of hot gases, a turbine associated with said combustion chamber means and adapted to be operated by said hot gases, means to drivingly connect said turbine and said rotary compressor, a by-pass line connected between said first conduit means and said second conduit means and means in said by-pass line to block the flow of air therethrough except when the output pressure of said compressor cylinder exceeds a predetermined value.

3. The invention as claimed in claim 2, wherein said combustion chamber means comprises two series-connected combustion chambers the downstream one of which encloses said turbine and both of which enclose a heat transfer portion of said first conduit means; and wherein means are provided to selectively by-pass the upstream one of said combustion chambers, said by-pass means including a conduit extending between the inlet to said upstream combustion chamber and said downstream combustion chamber.

4. The invention as claimed in claim 3, wherein a scavenging blower is provided in said second conduit means and adapted to be driven by said turbine.

5. A hot air engine, comprising a plurality of compressor cylinders and a plurality of power cylinders, compressor and power pistons mounted, respectively, in said cylinders and connected to a common crankshaft, intake and exhaust manifolds for said compressor cylinders and for said power cylinders, intake and exhaust valves for each of said compressor cylinders and for each of said power cylinders, a rotary air compressor connected to the intake manifold of said compressor cylinders, first conduit means to connect the exhaust manifold for said compressor cylinders and the intake manifold for said power cylinders, combustion chamber means enclosing at least a portion of said first conduit means in heat transfer relationship, second conduit means to connect the exhaust manifold for said power cylinders and said combustion chamber means, a turbine adapted to be operated by combustion products generated in said combustion chamber means and connected to drive said rotary air compressor, said rotary air compressor and said turbine being independent of said crankshaft, the exhaust valve for each of said power cylinders including passages to both the upper and lower cylinder ends for rapid scavenging of air therefrom, and a scavenging blower in said second conduit means adapted to be driven by said turbine.

References Cited in the file of this patent

UNITED STATES PATENTS

| 50,875 | Kilbourn | Nov. 7, 1865 |
| 866,457 | Gibbs | Sept. 17, 1907 |
| 1,140,065 | Rateau | May 18, 1915 |
| 1,460,300 | Whitfield | June 26, 1923 |
| 1,601,402 | Lorenzen | Sept. 28, 1926 |
| 2,067,453 | Lee | Jan. 12, 1937 |
| 2,628,015 | Neugebauer et al. | Feb. 10, 1953 |

FOREIGN PATENTS

| 213,793 | Switzerland | June 3, 1941 |